United States Patent
Kawano et al.

(10) Patent No.: US 7,881,526 B2
(45) Date of Patent: Feb. 1, 2011

(54) IMAGE PROCESSING PERFORMING COLOR CONVERSION ON AN INPUT IMAGE

(75) Inventors: Hiroyuki Kawano, Kanagawa (JP); Yuzuru Suzuki, Kanagawa (JP); Kunikazu Ueno, Kanagawa (JP); Koichi Fujii, Kanagawa (JP); Shunsuke Kodaira, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1147 days.

(21) Appl. No.: 11/546,464

(22) Filed: Oct. 12, 2006

(65) Prior Publication Data

US 2007/0139675 A1 Jun. 21, 2007

(30) Foreign Application Priority Data

Dec. 17, 2005 (JP) ............................. 2005-364148

(51) Int. Cl.
*G06K 9/00* (2006.01)
*G06K 15/00* (2006.01)

(52) U.S. Cl. ......................................... 382/162; 358/2.1

(58) Field of Classification Search ...................... None
See application file for complete search history.

(56) References Cited

U.S. PATENT DOCUMENTS

| | | | |
|---|---|---|---|
| 5,200,840 A | | 4/1993 | Koike et al. |
| 5,465,173 A * | | 11/1995 | Ishikawa et al. ............ 358/534 |
| 6,204,933 B1 * | | 3/2001 | Yoshino et al. .............. 358/1.9 |
| 6,330,076 B1 | | 12/2001 | Imaizumi et al. |
| 6,426,809 B1 * | | 7/2002 | Hayashi et al. ............. 358/529 |
| 6,434,266 B1 * | | 8/2002 | Kanno et al. ................ 382/162 |
| 6,483,609 B1 * | | 11/2002 | Ueno et al. ................. 358/434 |
| 6,961,460 B2 * | | 11/2005 | Nagai et al. ................ 382/162 |
| 6,977,754 B2 * | | 12/2005 | Matsumoto et al. .......... 358/1.9 |
| 7,215,814 B2 * | | 5/2007 | Suzuki ..................... 382/167 |
| 2002/0093685 A1 | | 7/2002 | Suzuki |
| 2003/0123092 A1 * | | 7/2003 | Toda ........................ 358/2.1 |

(Continued)

FOREIGN PATENT DOCUMENTS

EP  0 202 425 A2  11/1986

(Continued)

OTHER PUBLICATIONS

May 6, 2010 Office Action issued in Japanese Patent Application No. 2005-364148 (with English-language translation).

*Primary Examiner*—Yuzhen Ge
(74) *Attorney, Agent, or Firm*—Oliff & Berridge, PLC (57) ABSTRACT

An image processing apparatus performs color conversion processing on an input image. The image processing apparatus includes a block pallet conversion unit, a first color converting unit and a restoration unit. The block pallet conversion unit converts the input image in units of blocks into (i) pallet color information including pallet colors number of which is less than pixels included in one of the blocks and (ii) selection information used to select one of the pallet colors for each pixel. The first color converting unit performs color conversion on the pallet color information obtained by the block pallet conversion unit. The restoration unit selects for each pixel, based on the selection information, one of the pallet colors of the pallet color information, which is color-converted by the first color converting unit, to restores an image.

9 Claims, 9 Drawing Sheets

U.S. PATENT DOCUMENTS

2005/0088697 A1    4/2005    Yasutomi et al.

FOREIGN PATENT DOCUMENTS

| | | |
|---|---|---|
| EP | 0 407 213 A2 | 1/1991 |
| EP | 0 598 995 B1 | 6/1994 |
| EP | 0 741 489 A1 | 11/1996 |
| JP | A 06-164950 | 6/1994 |
| JP | A 09-9069 | 1/1997 |
| JP | A-09-179973 | 7/1997 |
| JP | A-11-088700 | 3/1999 |
| JP | B2 3023374 | 1/2000 |
| JP | A-2001-223913 | 8/2001 |
| JP | A-2002-182635 | 6/2002 |
| JP | A-2002-209103 | 7/2002 |

* cited by examiner

IMAGE PROCESSING PERFORMING COLOR CONVERSION ON AN INPUT IMAGE

BACKGROUND

1. Technical Field

The invention relates to an image processing technique of performing color conversion processing on an input image.

2. Related Art

Color conversion processing is performed on an image in various situations such as a situation that image processing is performed on a scanned-in image and a resulting processed image is output to a print engine in a copier. Among conventional color conversion methods in copiers, a method, which uses a multi-dimensional look-up table with interpolation, is called "DLUT" (direct look-up table).

Figure 9:
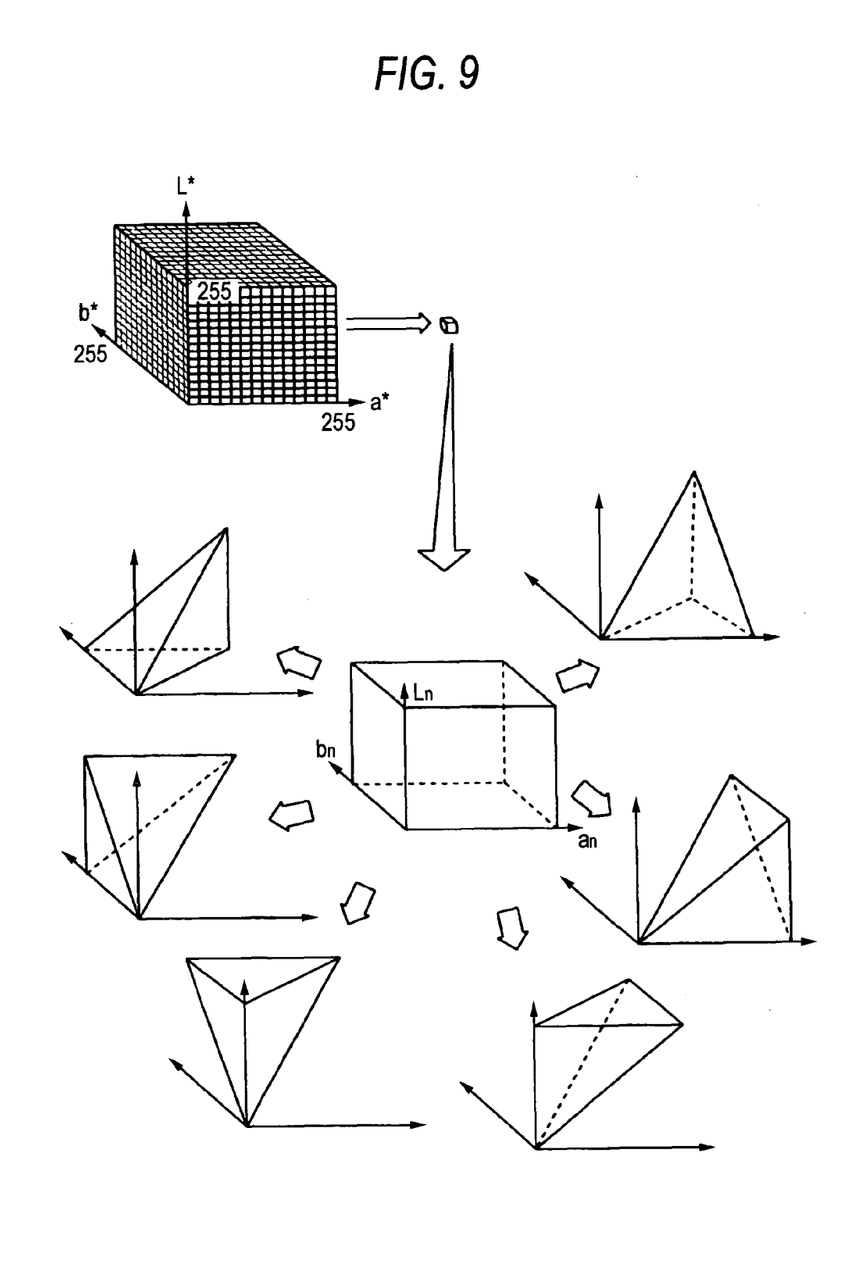
FIG. 9 illustrates an exemplary color conversion method using a DLUT.

FIG. 9 illustrates an exemplary color conversion method using a DLUT. In this example, the three-dimensional L*a*b* color space is divided in such a manner that each of the L*, a*, and b* axes is divided into a prescribed number of sections. The space is divided into cubes or rectangular parallelepipeds and their vertexes are called "lattice points." Color conversion result values are held for the respective vertexes. In the case of a conversion into the CMYK color space, for example, CMYK values are held so as to correspond to the respective lattice points.

For interpolation operation, each divisional cube or rectangular parallelepiped is further divided into six tetrahedrons as shown in FIG. 9. To which tetrahedron input values (L*, a*, b*) belong are judged on the basis of the input values (L*, a*, b*) themselves, and an interpolation operation is performed by using CMYK values corresponding to the four vertexes (lattice points) of the tetrahedron thus found. In this manner, arbitrary input values (L*, a*, b*) can be converted into CMYK values.

SUMMARY

According to an aspect of the invention, an image processing apparatus performs color conversion processing on an input image. The image processing apparatus includes a block pallet conversion unit, a first color converting unit and a restoration unit. The block pallet conversion unit converts the input image in units of blocks into (i) pallet color information including pallet colors number of which is less than pixels included in one of the blocks and (ii) selection information used to select one of the pallet colors for each pixel. The first color converting unit performs color conversion on the pallet color information obtained by the block pallet conversion unit. The restoration unit selects for each pixel, based on the selection information, one of the pallet colors of the pallet color information, which is color-converted by the first color converting unit, to restores an image.

BRIEF DESCRIPTION OF THE DRAWINGS

Exemplary embodiments of the invention will be described in detail based on the following figures, wherein.

DETAILED DESCRIPTION

Figure 1:
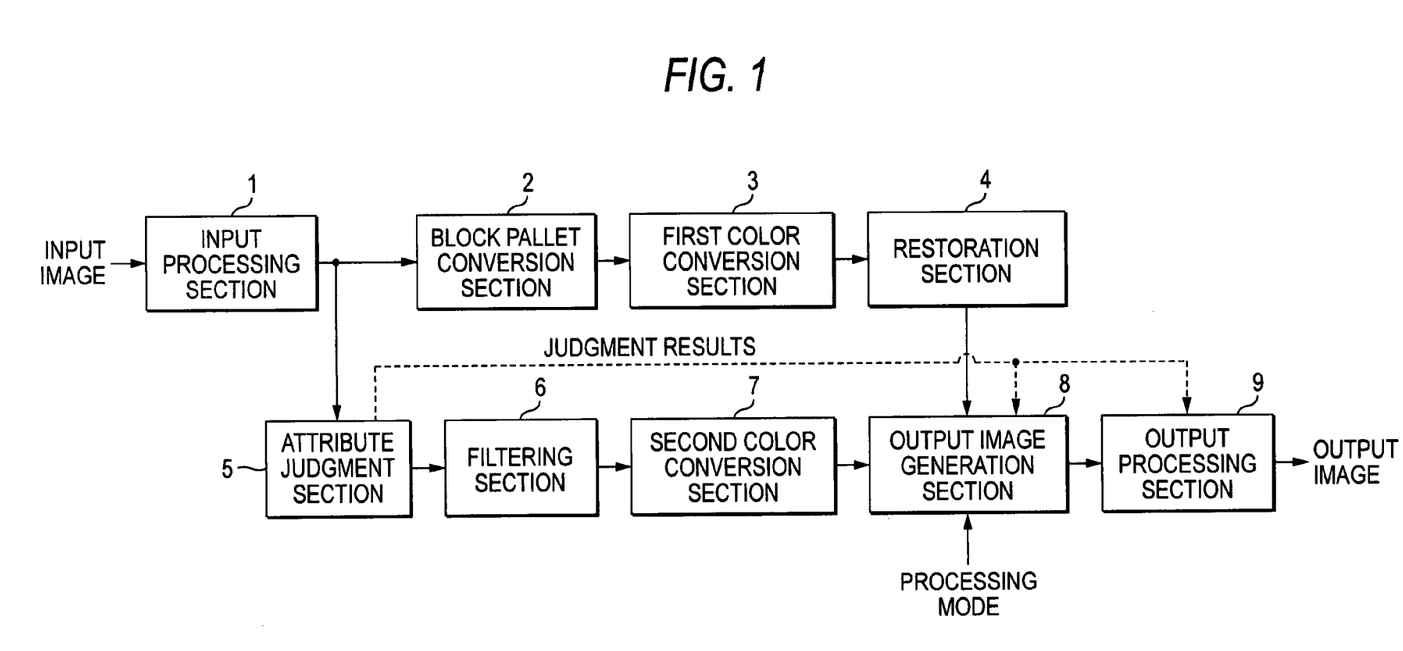
FIG. 1 is a block diagram showing a first exemplary embodiment of the invention.

FIG. 1 is a block diagram showing a first exemplary embodiment of the invention. In FIG. 1, reference numeral 1 denotes an input processing section; 2, a block pallet conversion section; 3, a first color conversion section; 4, a restoration section; 5, an attribute judgment section; 6, a filtering section; 7, a second color conversion section; 8, an output image generation section; and 9, an output processing section. The input processing section 1 performs, on an input image, various kinds of image processing that should be performed before color conversion processing. The color spaces of the input image and an output image are arbitrary.

The block pallet conversion section 2 converts an image input through the input processing section 1 in units of blocks into pallet color information, which includes number of colors less than number of pixels of a block, and selection information used to a pallet color for each pixel in the block.

The first color conversion section 3 performs a color conversion on respective pallet colors of the pallet color information obtained by the block pallet conversion section 2. If the input image color space and the output image color space are different from each other, the first color conversion section 3 also performs a color space conversion. In this exemplary embodiment, the first color conversion section 3 performs a color conversion on images for which importance is attached to the gradation performance rather than the resolution, such as pictorial images (e.g., photographs). The first color conversion section 3 can perform a highly accurate color conversion using a DLUT, for example. Since the image has been converted into the pallet color information, which includes the number of colors less than the number of pixels in the block, the number of colors of the processing subject is much smaller than that of the original image and hence the amount of processing can be made much smaller than in the case where a color conversion is performed without the pallet conversion.

The restoration section 4 selects the pallet color information on which the color conversion is performed by the first color conversion section 3, in accordance with the selection information obtained by the block pallet conversion section 2 to restore the image in units of the block.

The attribute judgment section 5 judges attributes of respective regions of the input image and passes judgment results to the output image generation section 8 and the output processing section 9. The attribute judging method is arbitrary and may be a known method. The attribute judgment section 5 distinguishes between text/line-drawing portions and other portions.

The filtering section 6 extracts edges from the input image and performs adaptive filtering on the input image. This is edge emphasis processing for increasing the image quality of the text/line-drawing portions. Also, the filtering section 6 may be omitted.

The second color conversion section 7 performs a color conversion on a filtered image received from the filtering section 6. If the input image color space and the output image color space are different from each other, the second color conversion section 7 also performs a color space conversion. In this exemplary embodiment, the second color conversion section 7 performs a color conversion on images for which importance is attached to the resolution, such as text images and line-drawing images. Although the second color conversion section 7 may also be configured to use a DLUT or the like, the second color conversion section 7 is not required to perform a highly accurate color conversion because the gradation performance is not very important. Therefore, the second color conversion section 7 can employ a color conversion method that is smaller in the amount of calculation than a color conversion method, which is employed by the first color conversion section 3. The processing speed can be increased by simplifying the processing, for example, decreasing the number of reference data to simplify an interpolation method. Naturally, color conversion methods other than the method using a DLUT, such as a matrix conversion, may be used.

The output image generation section 8 generates an output image from the image restored by the restoration section 4 in units of the block and/or a color-converted image received from the second color conversion section 7. Which of the image restored by the restoration section 4 and the color-converted image received form the second color conversion section 7 should be selected can be determined on the basis of, for example, judgment results of the attribute judgment section 5, preset processing modes, and/or system resources situations. For example, an output image may be generated in the following manner. The color-converted image received form the second color conversion section 7 is selected for regions that have been judged to be text/line-drawing regions by the attribute judgment section 5 and the image restored by the restoration section 4 is selected for other regions, and an output image is formed by synthesizing the thus-selected portions.

For example, the processing modes may include a document mode and a color mode. An output image may be generated by selecting the color-converted image received form the second color conversion section 7 if the document mode is a text mode and selecting the image restored by the restoration section 4 if the document mode is a photograph mode. An output image may be generated by selecting the image restored by the restoration section 4 if the color mode is color and selecting a black-and-white-gradation-converted image received from the second color conversion section 7 or a filtered image produced by the filtering section 6 (no color conversion is performed by the second color conversion section 7) if the color mode is black and white. Furthermore, image switching may be made in accordance with a processing speed mode indicating whether importance is attached to the processing speed or the image quality. The image restored by the restoration section 4 may be selected in a speed priority mode in which importance is attached to the processing speed, and the color-converted image received form the second color conversion section 7 may be selected in an image quality priority mode in which importance is attached to the image quality. Naturally, where another processing mode exists, image switching may be made in a similar manner, that is, either image may be selected depending on whether importance is attached to the gradation performance or the resolution.

Still further, the above processing modes and judgment results of the attribute judgment section 5 may be used in combination. One example is such that the image restored by the restoration section 4 is selected throughout the image in the speed priority mode and either image is selected on a region-by-region basis in accordance with the judgment results of the attribute judgment section 5 in the image quality priority mode. Another example is such that either image is selected on a region-by-region basis in accordance with the judgment results of the attribute judgment section 5 if the document mode is a text/photograph mixture mode and either image is selected throughout the image if the document mode is the text mode or the photograph mode. The judgment results of the attribute judgment section 5 may be combined with other processing modes in similar manners. Conversely, where image switching is performed in accordance with only the processing modes, the attribute judgment section 5 may be omitted.

The output processing section 9 performs various kinds of image processing on an image produced by the color conversion processing. This processing may be performed in accordance with the judgment results of the attribute judgment section 5.

Figure 2:
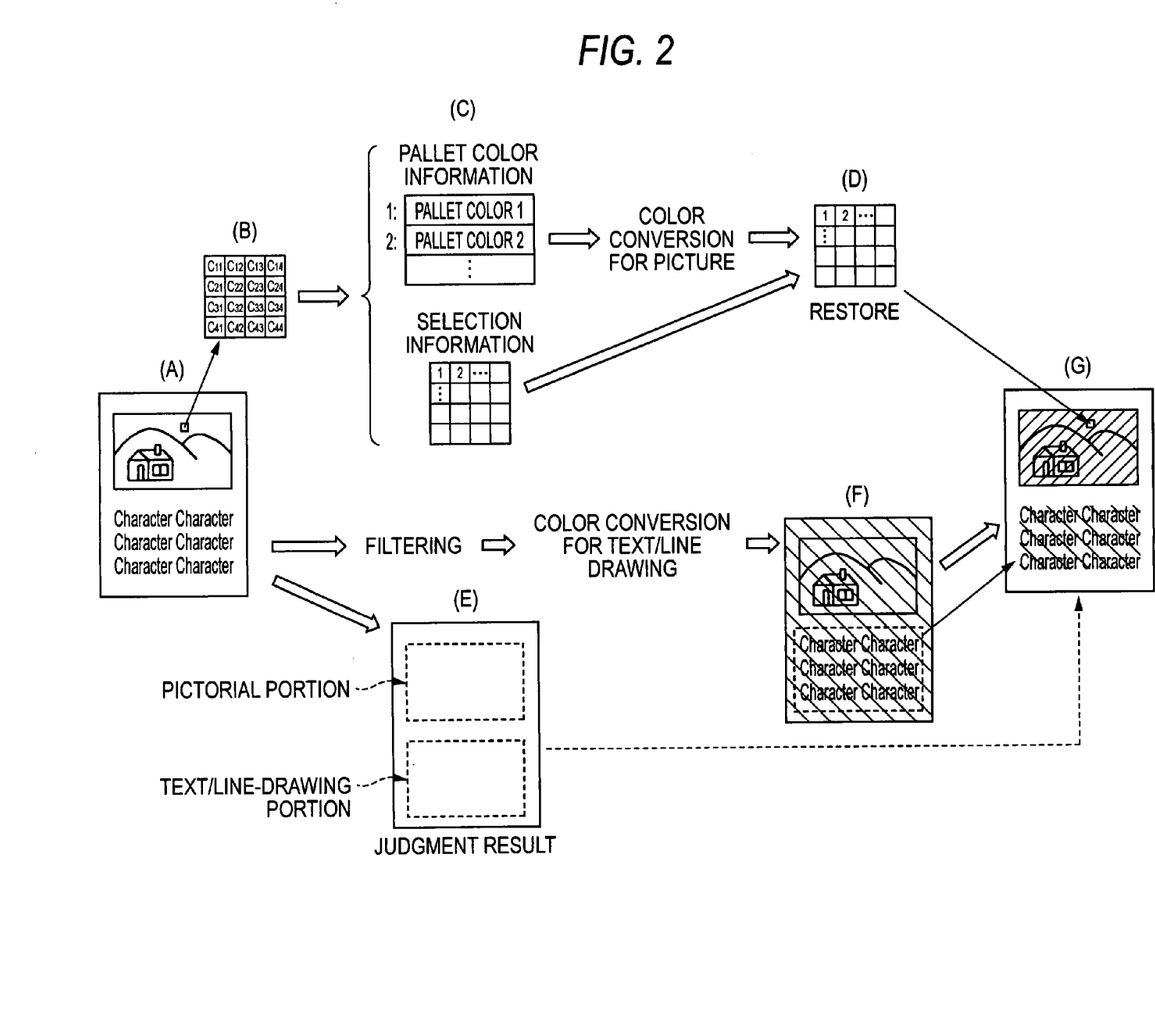
FIG. 2 is an explanatory diagram showing a specific example of the operation of the first exemplary embodiment of the invention.

FIG. 2 is an explanatory diagram showing a specific example of the operation of the first exemplary embodiment of the invention. A description will be made of a case that an image of FIG. 2(A) having a photograph in an upper portion and a text in a lower portion is subjected to both of the processing of the block pallet conversion section 2, the first color conversion section 3, and the restoration section 4 and the processing of the filtering section 6 and the second color conversion section 7.

The image of FIG. 2(A) is processed by the input processing section 1 and then input to the block pallet conversion section 2 and the attribute judgment section 5. The block pallet conversion section 2 converts the image shown in FIG. 2(A) into the pallet color information and the selection information in units of the block. FIG. 2(B) shows one of blocks included in the image shown in FIG. 2(A). In FIG. 2, the one of the blocks shown in FIG. 2(B) is converted into the pallet color information and the selection information as shown in FIG. 2(C). In this example, one block consists of 4×4 pixels. Colors of the pixels included in this block are approximated to some of pallet colors of the pallet color information shown in FIG. 2(C). The number of the pallet colors is less than the number of pixels included in the block. In this example, colors of 16 pixels included in one block are condensed into four pallet colors at maximum. Then, each pixel is converted into the selection information used top select any of the pallet colors. At this time, if a color of a pixel is different from any of the pallet colors, a pallet color similar to the color of the pixel is selected. By this processing, a color of each pixel is approximated to any of the pallet colors.

The first color conversion section 3 performs a highly accurate color conversion process for pictorial images on each pallet color of the thus-obtained pallet color information. The first color conversion section 3 performs this color conversion process the number of times, which is equal to the number of the pallet colors less than the number of pixels included in the block.

Thereafter, the restoration section 4 selects a pallet color from the pallet color information, which has been subjected to the color conversion process, in accordance with the selection information shown in FIG. 2(C) to obtain a color-converted block shown in FIG. 2(D). Although a single block is shown in FIG. 2(D) as an image stored by the restoration section 4, the above described series of processings are performed on each of blocks included in the input image.

On the other hand, the attribute judgment section 5 judges, for each pixel or each set of plural pixels, an attribute of the image processed by the input processing section 1. Assume here that as shown in FIG. 2(E) the attribute judgment section 5 has judged that the upper photograph portion has a picture attribute and the lower text portion has a text/line-drawing attribute.

The filtering section 6 performs the filtering on the image processed by the input processing section 1 to emphasize the edges of the image and then, the second color conversion section 7 performs the color conversion processing for a text/line drawing, on the filtered image. The color conversion processing for a text/line drawing is not required to be highly accurate and hence may be of a type that the amount of processing is small and enables high-speed processing. FIG. 2(F) shows a color-converted image generated by the second color conversion section 7.

The output image generation section 8 generates an output image in accordance with the judgment results of the attribute judgment section 5. Based on the judgment results shown in FIG. 2(D), the output image generation section 8 selects the restored image of FIG. 2(C) for the upper portion of the image and selects the color-converted image of FIG. 2(F) generated by the second color conversion section 7 for the lower portion of the image. As a result, the output image generation section 8 generates an output image of FIG. 2(G). The output image is processed by the output processing section 9 and then output.

As described above, whereas the photograph portion of the output image is lowered in substantial resolution because it has been subjected to the pallet conversion process and the color conversion process, it is color-converted with high accuracy. The text portion is color-converted while the resolution is maintained.

Figure 3:
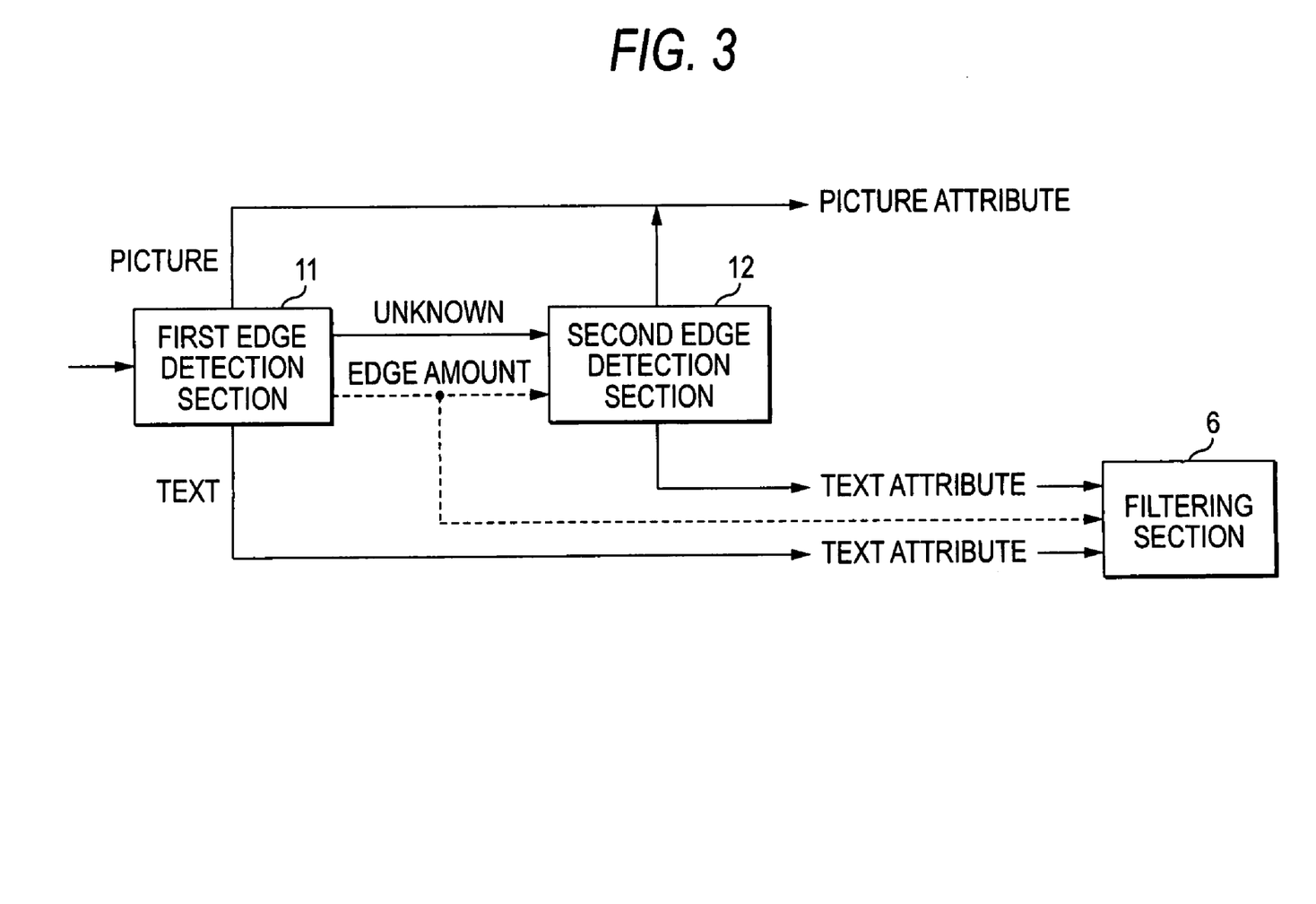
FIG. 3 is a block diagram showing an example of an attribute judgment section.

In the configuration of FIG. 1, further increase in processing speed is possible in the attribute judgment section 5 and the filtering section 6. FIG. 3 is a block diagram showing an example of the attribute judgment section 5. In FIG. 3, reference numeral 11 denotes a first edge detection section and reference numeral 12 denotes a second edge detection section. Whereas various attribute judging methods are available, this example employs a simple attribute judging method that uses the edge amount.

The first edge detection section 11 detects an edge amount by means of a simple edge detection filter, for example. The first edge detection section 11 produces a judgment result "text attribute" if the edge amount is larger than a first threshold value, produces a judgment result "picture attribute" if the edge amount is smaller than a second threshold value, which is smaller than the first threshold value, and produces a judgment result "attribute unknown" in the other case. The first and second threshold values may be varied in accordance with the attribute judgment result of the preceding pixel. For example, only the first threshold value or both of the first and second threshold values are decreased if a judgment result "text attribute" is produced for the preceding pixel. This increases the probability that a judgment result "text attribute" is also produced for the subject pixel. For example, only the second threshold value or both of the first and second threshold values are increased if a judgment result "picture attribute" is produced for the preceding pixel. This increases the probability that a judgment result "picture attribute" is also produced for the subject pixel. Varying the threshold values in the above manner can increase the number of pixels whose attributes are determined by the first edge detection section 11, which requires a small amount of processing.

The second edge detection section 12 judges attributes by more detailed processing than the first edge detection section 11, and can judge attributes by one or a combination of various methods. For example, even where the second edge detection section 12 uses an edge detection filter, it may employ a filter having a lager size than the first edge detection section 11. An attribute judgment, which uses an edge amount obtained in this case, may be made by comparing the edge amount with another prescribed threshold value. This threshold value may be weighted by using the edge amount obtained in the first edge detection section 11, more specifically, by the difference between the edge amount and the intermediate value of the first and second threshold values of the first edge detection section 11.

A pixel (or a region consisting of plural pixels) that has been judged to be a text attribute pixel by the first edge detection section 11 or the second edge detection section 12 is subjected to filtering in the filtering section 6. Edge amounts obtained in the first edge detection section 11 of the attribute judgment section 5 may be used in the filtering. For example, a result of a sum-of-products operation on the edge amounts and edge intensities obtained by an edge emphasis filter may be employed as a filtering result.

Also in the filtering section 6, the filtering may be switched in accordance with the judgment results of the attribute judgment section 5, in particular, whether a text attribute has been detected in the first edge detection section 11 or the second edge detection section 112. For example, filtering may be performed by a small-size emphasis filter if a text attribute has been detected in the first edge detection section 11, and by a large-size emphasis filter if a text attribute has been detected in the second edge detection section 12. Naturally, the filtering method may be changed.

The configuration of the attribute judgment section 5 shown in FIG. 3, the modification to the processing of the filtering section 6, and other features can also be applied to the following exemplary embodiments in similar manners.

Figure 4:
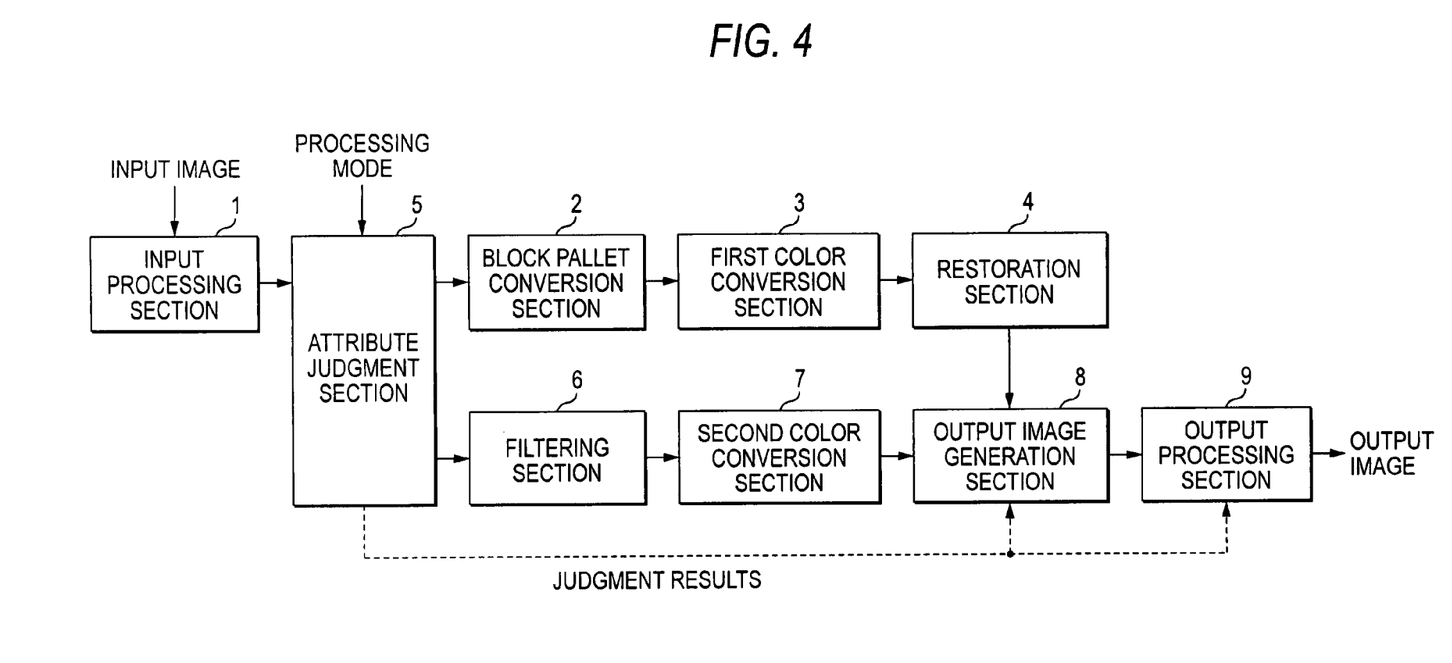
FIG. 4 is a block diagram showing a second exemplary embodiment of the invention.

FIG. 4 is a block diagram showing a second exemplary embodiment of the invention. FIG. 4 employs the same reference numerals as FIG. 1 and redundant descriptions will be omitted. In this exemplary embodiment, the attribute judgment section 5 has a function of assigning portions of an image to the block pallet conversion section 2 and the filtering section 6 in accordance with judgment results of the attribute judgment section 5. Portions of an image may be assigned in accordance with processing modes rather than or in combination with image judgment results. The attribute judgment may be performed for each block that includes only one pixel or consists of two or more pixels (in the block pallet conversion section 2). The attribute judgment may be performed in units of blocks, which is used by the block pallet conversion section 2 when converting blocks into pallels.

In the exemplary embodiment of FIG. 1, color conversion processing is performed by the first color conversion section 3 and the second color conversion section 7 for regions that will not be selected by the output image generation section 8. In contrast, in the second exemplary embodiment, color conversion processing is performed by only one of the first color conversion section 3 and the second color conversion section 7. Therefore, the total processing time can be shortened and the total processing speed can be increased even in the case where, for example, the second color conversion section 7 performs color conversion processing that is relatively high in accuracy.

Figure 5:
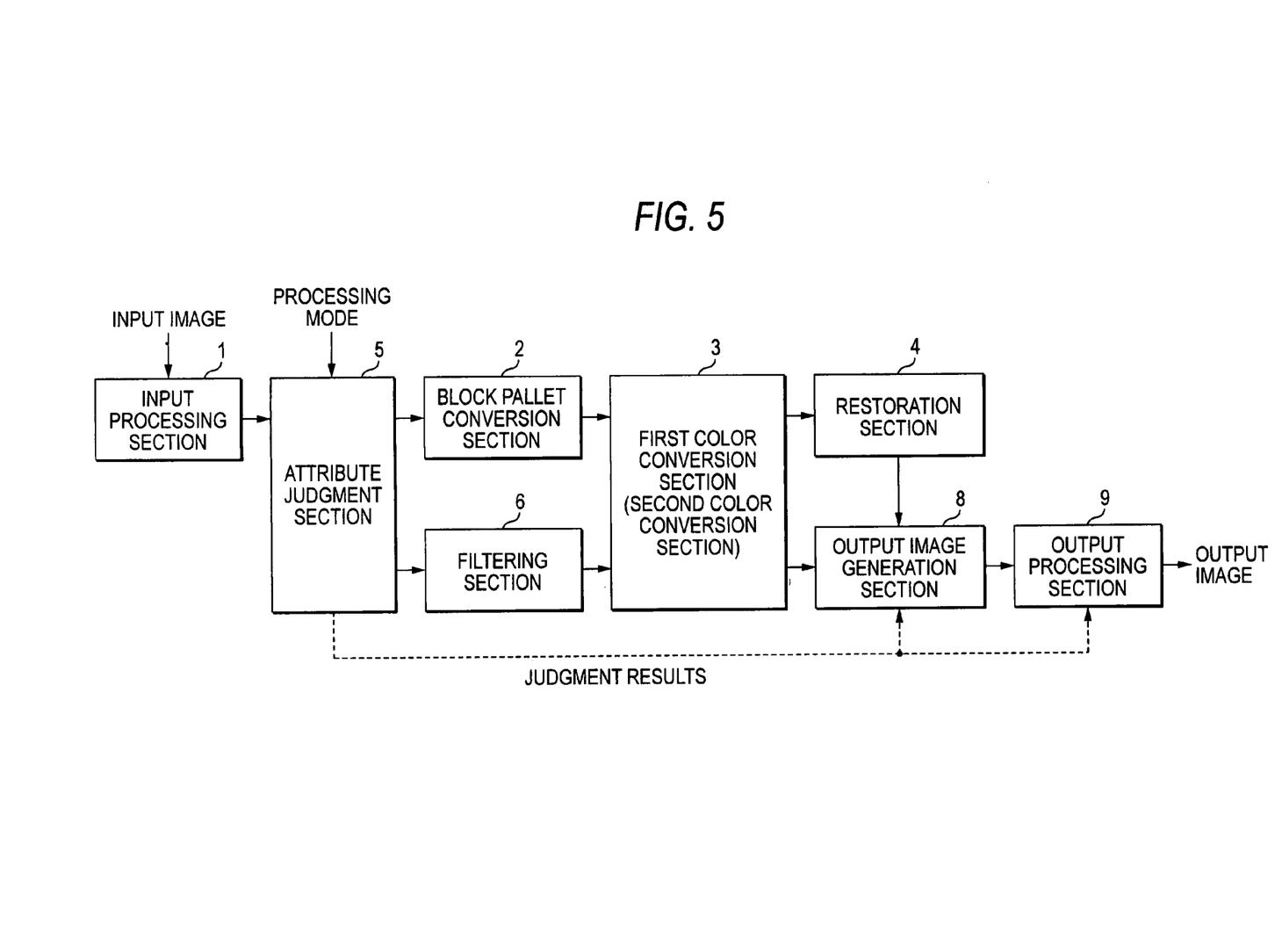
FIG. 5 is a block diagram showing a modification of the second exemplary embodiment of the invention.

FIG. 5 is a block diagram showing a modification of the second exemplary embodiment of the invention. FIG. 5 employs the same reference numerals as FIG. 4. This modification is such that the first color conversion section 3 also serves as the second color conversion section 7. As described above, the total processing speed can be increased by decreasing the number of pixels to be processed by the block pallet conversion section 2. Therefore, the processing speed for the entire image can be increased even if a highly accurate color conversion is performed on text/line-drawing portions that are required to be high in resolution.

Figure 6:
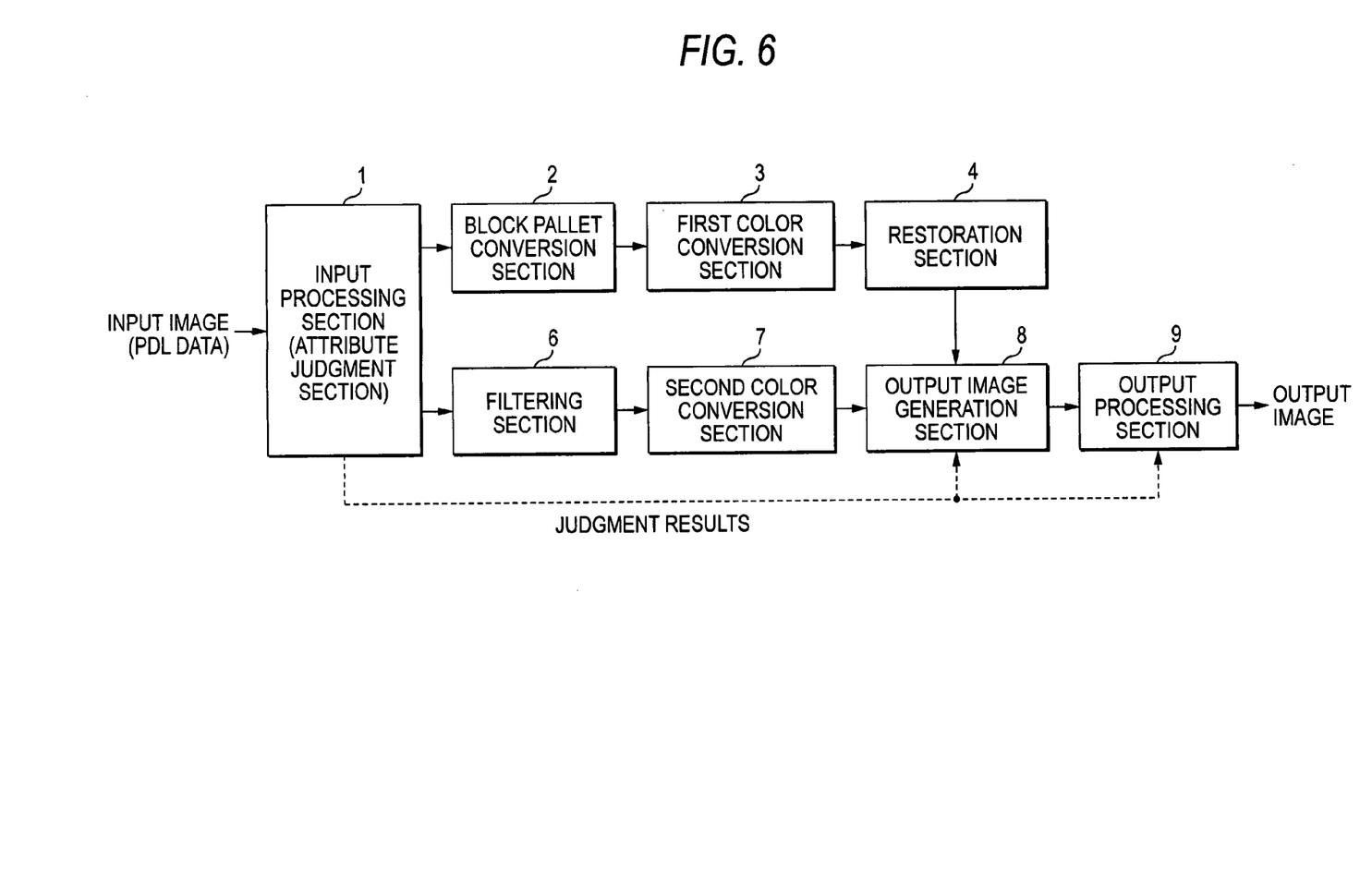
FIG. 6 is a block diagram showing another modification of the second exemplary embodiment of the invention.

FIG. 6 is a block diagram showing another modification of the second exemplary embodiment of the invention. This modification is such that data written in PDL (printer description language) are received as input image data.

The input processing section 1 interprets input image data that are written in PDL and judges attributes of respective drawing objects. Therefore, in this modification, the input processing section 1 also performs the function of the attribute judgment section 5. For example, if a PDL-judged attribute is a text attribute, data in that region are input to the filtering section 6 and then subjected to the color conversion processing of the second color conversion section 7. If a PDL-judged attribute is a picture attribute, data in that region are input to the block pallet conversion section 2 and then subjected to the color conversion processing of the first color conversion section 3. If PDL data include a raster image, the raster image may be subjected to area separation processing and then subjected to color conversion processing for a text or a picture.

This configuration is effective in applying the invention to a printer or an apparatus having a printer function.

Figure 7:
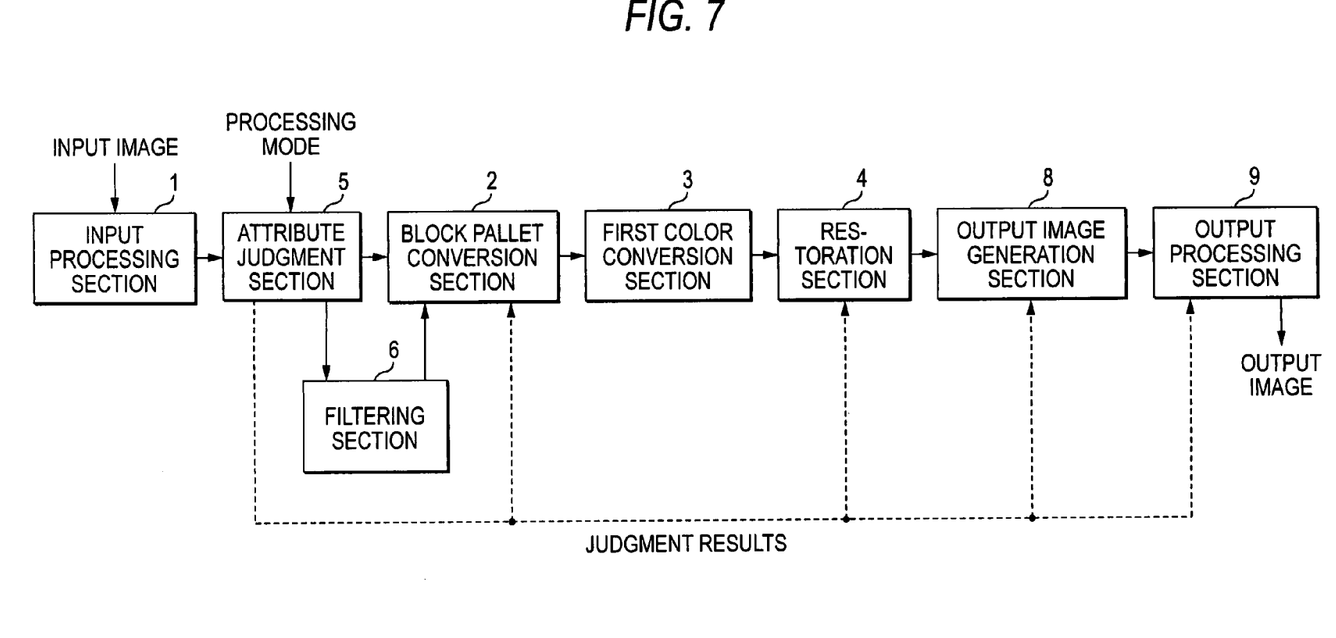
FIG. 7 is a block diagram showing a third exemplary embodiment of the invention.

FIG. 7 is a block diagram showing a third exemplary embodiment of the invention. FIG. 7 employs the same reference numerals as FIG. 1. In this exemplary embodiment, the number of the pallet colors of the pallet color information obtained by the block pallet conversion section 2 is variable. As the number of the pallet colors of the pallet color information obtained by the block pallet conversion section 2 is set to be smaller, the number of pixels on which the first color conversion section 3 performs the color conversion process becomes smaller. Therefore, the processing speed can be enhanced. However, since some colors are condensed into a single color, substantial resolution is deteriorated. Also, if the number of the pallet colors of the pallet color information is equal to the number of pixels, the same resolution can be achieved as in the related-art case where the color conversion process is performed without the pallet conversion process.

The attribute judgment section 5 produces control information on the basis of attribute judgment results, a given processing mode, etc. and supplies it to the block pallet conversion section 2 and the restoration section 4. In this exemplary embodiment, the processing of the filtering section 6 is performed for regions that have been judged to be text/line-drawing regions.

The block pallet conversion section 2 sets the maximum number of pallet colors of the pallet color information based on control information received from the attribute judgment section 5. Then, the block pallet conversion section 2 converts the image received through the attribute judgment section 5 into the pallet color information and the selection information in units of the blocks. The first color conversion section 3 performs the color conversion process on the respective pallet colors included in the pallet color information. The restoration section 4 selects any of the pallet colors of the pallet color information, which has been subjected to the color conversion process, in accordance with the selection information. Then, the restoration section 4 outputs the selected pallet color.

With the above configuration, in a high-speed processing mode or for pictorial regions such as photograph regions, the amount of processing of the first color conversion section 3 can be reduced by decreasing the maximum number of the pallet colors of the pallet color information to be less than the number of pixels of a single block. Hence, the total processing speed can be increased. In an image quality priority mode or for text/line-drawing regions, the color conversion processing of the first color conversion section 3 may be performed by increasing the maximum number of the pallet colors of the pallet color information, for example, to be equal to the number of pixels in a single block. In this case, an image that is high in both resolution and gradation performance can be obtained.

As described above, by controlling the number of the pallet colors of the pallet color information generated by the block pallet conversion section 2, the third exemplary embodiment can increase the processing speed and suppress reduction in resolution to an extent desired.

Even if the number of the pallet colors of the pallet color information is increased in text/line-drawing regions, the number of colors is small number inmost cases. Therefore, number of pallet colors actually used is small number.

Furthermore, if number of colors in text/line drawings is limited, a color of each pixel may be approximated using pallet colors number of which is similar to number of pallet colors for the pictorial regions. In this case, the pallet conversion process, the color conversion process and the restoration process may be performed on the entire image region.

Figure 8:
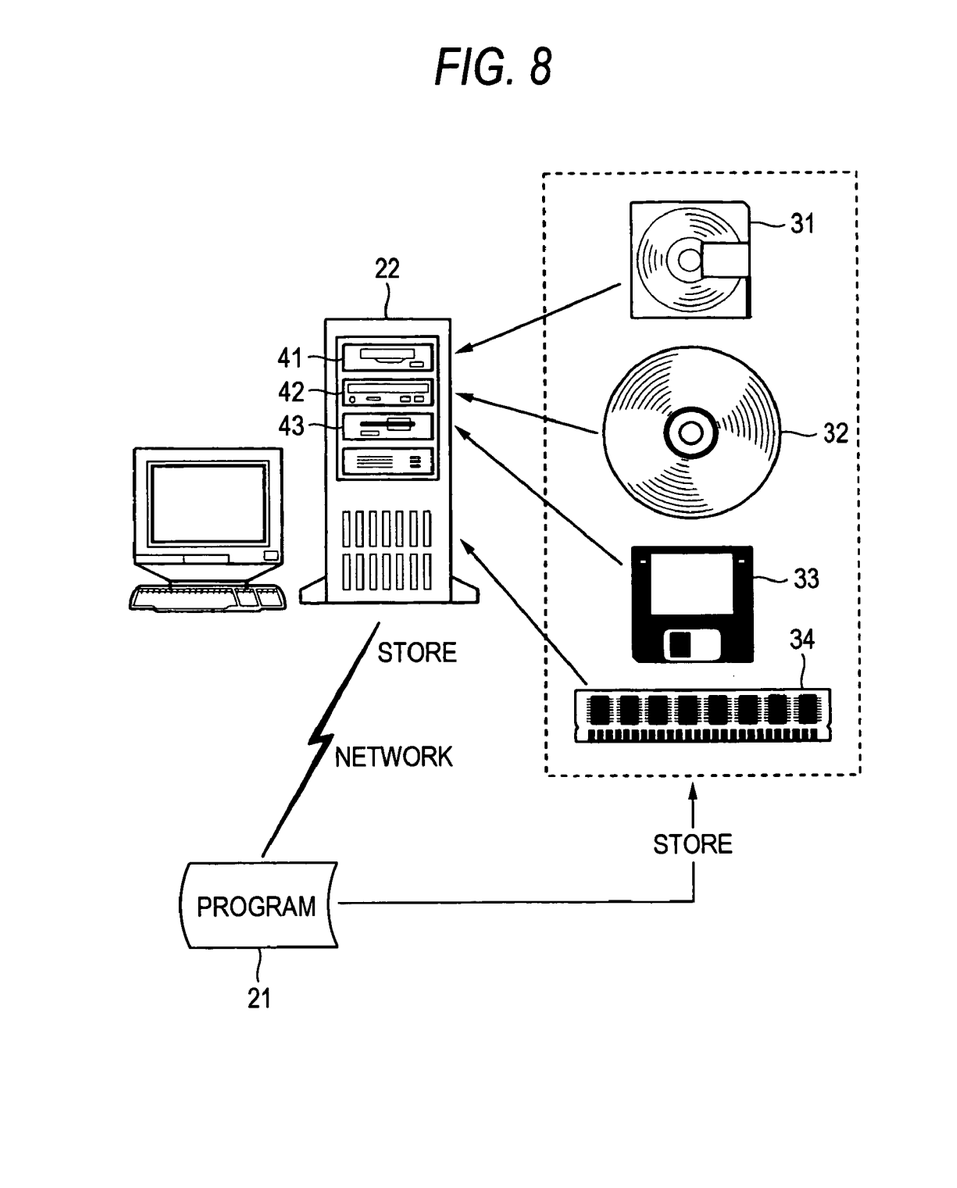
FIG. 8 is an explanatory diagram showing a computer program as an implementation of the functions of the image processing apparatus according to the exemplary embodiments of the invention or the image processing method according to the exemplary embodiments of the invention as well as exemplary storage media in which the computer program is stored.

FIG. 8 is an explanatory diagram of a computer program as an implementation of the functions of the image processing apparatus according to the invention or the image processing method according to the invention as well as exemplary storage media in which the computer program is stored. In FIG. 8, reference numeral 21 denotes a program; 22, a computer; 31, a magneto-optical disc; 32, an optical disc; 33, a magnetic disk; 34, a memory; 41, a magneto-optical disc drive; 42, an optical disc drive; and 43, a magnetic disk drive.

All or part of the configuration of each of the above-described embodiments and modifications can be realized by the program 21 which can be run by a computer. Where it is realized by the program 21, the program 21, data used by the program 21, and other information can be stored in a computer-readable storage medium. The term "storage medium" means a medium which makes it possible to transmit the description contents of a program to a reading device as a hardware resource of a computer in the form of a signal corresponding to variation states of magnetic, optical, electrical, or like energy that are caused according to the description contents of the program. Examples of the storage medium are the magneto-optical disc 31, the optical disc 32 (including a CD and a DVD), the magnetic disk 33, and the memory 34 (including an IC card and a memory card). Naturally, the storage medium is not limited to portable ones.

The functions of image processing apparatus according to the invention can be performed or processing can be performed according to the image processing method according to the invention by storing the program 21 in one of those storage media in advance, mounting the storage medium in the magneto-optical disc drive 41, the optical disc drive 42, the magnetic disk drive 43, a memory slot (not shown), or an interface (not shown) of the computer 22, for example, and causing the computer 22 to readout the program 21. The functions of image processing apparatus can be performed or processing can be performed according to the image processing method by mounting or incorporating a storage medium in the computer 22 in advance, transferring the program 21 to the computer 22 over a network, for example, and storing the program 21 in the storage medium, and causing the computer 22 to run the program 21. Naturally, all or part of the functions may be implemented by hardware.

[FIG. 1]
1: INPUT PROCESSING SECTION
2: BLOCK PALLET CONVERSION SECTION
3: FIRST COLOR CONVERSION SECTION
4: RESTORATION SECTION
5: ATTRIBUTE JUDGMENT SECTION
6: FILTERING SECTION
7: SECOND COLOR CONVERSION SECTION
8: OUTPUT IMAGE GENERATION SECTION
9: OUTPUT PROCESSING SECTION
A: INPUT IMAGE
B: JUDGMENT RESULTS
C: PROCESSING MODE
D: OUTPUT IMAGE

[FIG. 2]
A: Character Character . . .
B: PALLET COLOR INFORMATION
C: PALLET COLOR
D: SELECTION INFORMATION
E: COLOR CONVERSION FOR PICTURE
F: RESTORE
G: FILTERING
H: COLOR CONVERSION FOR TEXT/LINE DRAWING
I: PICTORIAL PORTION
J: TEXT/LINE-DRAWING PORTION
K: JUDGMENT RESULTS

[FIG. 3]
6: FILTERING SECTION
11: FIRST EDGE DETECTION SECTION
12: SECOND EDGE DETECTION SECTION
A: PICTURE
B: TEXT
C: UNKNOWN
D: EDGE AMOUNT
E: PICTURE ATTRIBUTE
F: TEXT ATTRIBUTE

[FIG. 4]
1: INPUT PROCESSING SECTION
2: BLOCK PALLET CONVERSION SECTION
3: FIRST COLOR CONVERSION SECTION
4: RESTORATION SECTION
5: ATTRIBUTE JUDGMENT SECTION
6: FILTERING SECTION
7: SECOND COLOR CONVERSION SECTION
8: OUTPUT IMAGE GENERATION SECTION
9: OUTPUT PROCESSING SECTION
A: INPUT IMAGE
B: JUDGMENT RESULTS
C: PROCESSING MODE
D: OUTPUT IMAGE

[FIG. 5]
1: INPUT PROCESSING SECTION
2: BLOCK PALLET CONVERSION SECTION
3: FIRST COLOR CONVERSION SECTION (SECOND COLOR CONVERSION SECTION)
4: RESTORATION SECTION
5: ATTRIBUTE JUDGMENT SECTION
6: FILTERING SECTION
8: OUTPUT IMAGE GENERATION SECTION
9: OUTPUT PROCESSING SECTION
A: INPUT IMAGE
B: JUDGMENT RESULTS
C: PROCESSING MODE
D: OUTPUT IMAGE

[FIG. 6]
1: INPUT PROCESSING SECTION (ATTRIBUTE JUDGMENT SECTION)
2: BLOCK PALLET CONVERSION SECTION
3: FIRST COLOR CONVERSION SECTION
4: RESTORATION SECTION
6: FILTERING SECTION
7: SECOND COLOR CONVERSION SECTION
8: OUTPUT IMAGE GENERATION SECTION
9: OUTPUT PROCESSING SECTION
A: INPUT IMAGE (PDL DATA)
B: JUDGMENT RESULTS
C: OUTPUT IMAGE

[FIG. 7]
1: INPUT PROCESSING SECTION
2: BLOCK PALLET CONVERSION SECTION
3: FIRST COLOR CONVERSION SECTION
4: RESTORATION SECTION
5: ATTRIBUTE JUDGMENT SECTION
6: FILTERING SECTION
8: OUTPUT IMAGE GENERATION SECTION
9: OUTPUT PROCESSING SECTION
A: INPUT IMAGE
B: JUDGMENT RESULTS
C: PROCESSING MODE
D: OUTPUT IMAGE

What is claimed is:

1. A non-transitory computer readable medium storing a computer readable program executable by a computer for causing the computer to execute a process for performing color conversion processing on an input image, the process comprising:

converting the input image in units of blocks into (i) pallet color information including pallet colors number of which is less than pixels included in one of the blocks and (ii) selection information used to select one of the pallet colors for each pixel;

performing first color conversion on the pallet color information;

selecting for each pixel, based on the selection information, one of the pallet colors of the pallet color information on which the first color conversion is performed, to restore an image;

performing second color conversion on the input image, a resolution of the input image subjected to the second color conversion is higher than that of input image subjected to the first color conversion;

generating an output image based on at least one of the restored image and the image subjected to the second color conversion; and judging an attribute of each region of the input image, wherein:

the generating of the output image comprises selecting for each region either the restored image or the image subjected to the second color conversion in accordance with the judged attribute of the corresponding region, and the selecting of either the restored image or the image subjected to the second color conversion comprises:

selecting the image subjected to the second color conversion for a region, which a result of the judging indicates as a text/line-drawing region, and selecting the restored image for a region, which the result of the judging indicates as a photograph region.

2. The non-transitory computer readable medium according to claim 1, the process further comprising:

extracting an edge from the input image and performing adaptive filtering on the input image, wherein:

the second color conversion is performed on the filtered image.

3. The non-transitory computer readable medium according to claim 1, wherein the generating of the output image comprises selecting either the image restored or the image subjected to the second color conversion in accordance with a processing mode.

4. The non-transitory computer readable medium according to claim 1, wherein the generating of the output image comprises selecting either the restored image or the image subjected to the second color conversion in accordance with a document mode.

5. The non-transitory computer readable medium according to claim 1, wherein the generating of the output image comprises selecting either the restored image or the image subjected to the second color conversion in accordance with a color mode.

6. The non-transitory computer readable medium according to claim 1, wherein:

the generating of the output image comprises selecting either the restored image or the image subjected to the second color conversion in accordance with a color mode, and the generating of the output image selects the image, which is subjected to an adaptive filtering and not subjected to the second color conversion if the color mode is a black-and-white mode.

7. The non-transitory computer readable medium according to claim 1, wherein the generating of the output image comprises selecting either the restored image or the image subjected to the second color conversion in accordance with a processing speed mode of an apparatus which performs the color conversion processing, the processing speed mode indicating whether priority is attached to the processing speed or the image quality.

8. The non-transitory computer readable medium according to claim 1, wherein the generating of the output image comprises selecting either the restored image or the image subjected to the second color conversion in accordance with a system resource situations of an apparatus, which performs the conversion processing.

9. The non-transitory computer readable medium according to claim 1, the process further comprising:

changing the number of the pallet colors in accordance with a processing mode.

* * * * *